UNITED STATES PATENT OFFICE.

MICHEL BODY, OF BRUSSELS, BELGIUM.

PROCESS OF TREATING SULFURETED ORES.

SPECIFICATION forming part of Letters Patent No. 625,433, dated May 23, 1899.

Application filed December 2, 1896. Serial No. 614,217. (No specimens.)

*To all whom it may concern:*

Be it known that I, MICHEL BODY, a citizen of Belgium, residing at Brussels, Belgium, have invented certain new and useful Improvements in Processes of Treating the Sulfureted Ores, (for which patents have been obtained in England, No. 10,827, dated June 4, 1894; in Germany, No. 89,779, dated August 27, 1895; in Belgium, No. 117,218, dated August 31, 1895; in France, No. 249,995, dated August 31, 1895; in Italy, No. XXX, 39,656, LXXVII, 456, dated August 31, 1895; in Austria, No. 46/1,025, dated March 18, 1896, and in Hungary, No. 4,139, dated October 30, 1895;) and I do hereby declare the following to be a full, clear, and exact description of the invention, such as will enable others skilled in the art to which it appertains to make and use the same.

My invention relates to the extraction of metals by a dry and wet process from refractory or more or less refractory complex sulfidic ores or minerals, such as auriferous and argentiferous pyrites and other similar minerals containing precious and other valuable metals in the form of sulfids.

The process is based upon the dissolving action of basic polysulfids upon metallic sulfids and upon the fact that these polysulfids can readily be precipitated from their solutions by conversion into simple sulfids, hyposulfites, sulfites, and sulfates, or, in other words, into insoluble salts, whereby such metals as gold, silver, copper, nickel, and iron can be obtained in a concentrated state and then separated from one another by well-known means.

In carrying out the process the ore or mineral is pulverized and mixed with a sufficient quantity of carbon and of a salt of a metal of the alkalies—as a sulfate, nitrate, carbonate, or hydrate, as of sodium or potassium—to form with the sulfur in the ore or mineral an alkaline polysulfid. The mixture is then melted, thrown into a sufficient quantity of water to wash out the polysulfids, well stirred, and then allowed to settle. I thus obtain an alkaline solution containing all the metals converted into polysulfids, and these can readily be precipitated by reconversion into insoluble salts—such as simple sulfids, hyposulfites, sulfites, and sulfates—by oxidation or acid reaction, in which latter case the alkalinity of the solution must be maintained. The sediment will be composed, essentially, of the non-metallic constituents of the mineral treated and of magnetic iron sulfid, the reactions taking place as follows, supposing the mineral treated to be a natural bisulfid of iron, (FeS$_2$,) and that sodium sulfate is used:

The presence of the sodium sulfate and carbon at a suitable temperature gives rise, in a mineral containing an excess of sulfur readily liberated—as, for instance, natural bisulfid of iron, (FeS$_2$)—to the formation of a polysulfid. This polysulfid takes hold of the generality of the metallic sulfids accompanying said bisulfid, reducing the latter to a minimum of sulfuration and converting it into a magnetic sulfid, (Fe$_3$S$_4$,) which precipitates, the reactions taking place in accordance with the following equations:

$$Na_2SO_4 + 4C = 4CO + Na_2S$$

$$3Na_2S + As2S_3 + S_2 = 2Na_3AsS_4$$

$$3Na_2S + Sb_2S_3 + S_2 = 2Na_3SbS_4$$

$$3Na_2S + 2Au + S_5 = 2Na_3AuS_4$$

When the melted material is thrown into a sufficient quantity of water, the greater portion of the metals will be dissolved. After stirring well it is allowed to settle, the solid deposit consisting, chiefly, of non-metallic or sterile matter and of the magnetic sulfid of iron, (Fe$_3$S$_4$,) above referred to. The solution is now decanted or filtered from the solid residues and air or air mixed with sulfurous-acid gas or sulfurous-acid gas is injected, or, if desired, even a strong acid may be mixed with the solution, but in such proportion as not to destroy its alkalinity, whereby the monosulfid of iron is precipitated, the latter carrying with it all of the metallic sulfids except the arsenic and antimony, which remain in solution in the still alkaline lye, to which a small proportion of lime is added.

The following reactions take place: By the action of the air or the air and sulfurous-acid gas or by the action of the latter or of another strong acid the polysulfids are converted into simple sulfids, sulfites, and sulfates, a selection between the different metallic sulfids taking place during this conversion, and they are precipitated in the form of a black mud, the monosulfids of iron and the simple sulfids of the copper group separating from the alkaline sulfids in a slightly-acid medium, gold and silver ceasing to be soluble in the sulfites, while the sulfids of arsenic and antimony remain in solution. The separations which intervene during the separation of these metals in the mass of soluble double polysulfids (metallic and alkaline) should be understood as follows: Taking into consideration the conversion of a sodium polysulfid, for instance, into a sulfate under the action of the air or acid, the metals, including the iron which is present in all minerals, separate successively, as follows:

$$2Na_2S + 3SO_2 = 2Na_2S_2O_3 + S$$

$$2Na_2S_5 + 3SO_2 = 2Na_2S_2O_3 + S_9,$$

$As_2S_3$, $Sb_2S_3$, and $AuS_2$ remaining in solution. $FeS$ is precipitated.

$$Na_2S_2O_3 + O_2 = Na_2SO_3 + SO_2$$

$$Na_2S_2O_3 + SO_2 = Na_2SO_3 + SO_2 + S,$$

$As_2S_3$ and $Sb_2S_3$ remaining in solution. $AuS_2$ is precipitated.

$$Na_2SO_3 + O = Na_2SO_4$$

$$Na_2SO_3 + 2SO_2 = Na_2SO_4 + SO_2 + S,$$

$As_2S_3$ and $Sb_2S_3$ being precipitated. These sulfids may also be converted into sulfites in an aqueous solution by the action of sulfurous acid according to the following equations:

$$Na_2S + SO_2H_2O = Na_2SO_3 + H_2S$$

$$2H_2S + SO_2 = 2H_2O + 3S.$$

From the foregoing it will be seen that if these reactions are arrested before the conversion of the sulfites into sulfates the whole of the gold and the other metals of the gold group are concentrated in a monosulfid of iron, while the sulfids of the arsenic group remain in solution and can therefore be readily removed. From this monosulfid of iron the gold and other metals of the same group can readily be separated by any well-known process, as by the lead process or by cupellation, while, if desired, the arsenic and antimony can be recovered from the mother liquor by oxidation, as these will be precipitated from their alkaline solution by exposure of the latter to the atmosphere or by destroying the alkalinity of the solution by means of a suitable acid or acid gas, as sulfurous-acid gas. The copper may likewise be separated from the precipitate by well-known means.

The magnetic iron that precipitates from the mother liquor no doubt carries with it some of the precious metals, and although the quantity is very small, yet may be appreciable enough to warrant its extraction, which can readily be done by any well-known process, as by means of chlorin, bromin, or cyanid or otherwise.

In the treatment of telluric pyrites, the sediment obtained from the mother liquid will contain this metal also, which can be easily separated by oxidation, as by exposure of the sediment to the action of air, so that the tellurium can be washed out by means of water and acid, and from its solution the tellurium salt can readily be obtained by well-known means.

The sulfurous-acid gas necessary to the process may be conveniently and cheaply derived from the melting furnace or furnaces, so that the process can be carried out in a very economical manner.

Having thus described my invention, what I claim as new therein, and desire to secure by Letters Patent, is—

1. In the extraction of metals from refractory sulfidic ores or minerals, the process which consists in converting the metallic sulfids in the ore or mineral into polysulfids by means of heat in the presence of carbon and of an alkali metal salt, washing out the polysulfids and treating the alkaline polysulfid solution without destroying its alkalinity, with a suitable precipitant to precipitate therefrom all of the metallic sulfids except those of arsenic antimony and tellurium, for the purposes set forth.

2. In the extraction of metals from refractory sulfidic ores or minerals, the process which consists in melting the ore or mineral in the presence of carbon and an alkali metal salt to convert the metallic sulfids into polysulfids, plunging the melted mass in water, washing out the polysulfids and treating the alkaline polysulfid solution, without destroying its alkalinity, with sulfurous-acid gas to precipitate therefrom all of said polysulfids except those of arsenic, antimony and tellurium for the purposes set forth.

3. The process of extracting metals from refractory complex sulfidic ores or minerals such as auriferous or argentiferous pyrites, which consists in melting the ore or mineral in the presence of carbon and of an alkaline salt, as a salt of a metal of the alkalies, plunging the melted mass into water, washing out the polysulfids formed, and precipitating the latter from the alkaline solution by converting the polysulfids into insoluble salts by subjecting said solution to the action of air and sulfurous-acid gas, maintaining the alkalinity of the solution during the operation of precipitation, removing the precipitate and separating the constituent metals.

4. In the process of treating sulfureted ores of a complex nature, comminuting and melting the ore in presence of an alkaline salt and carbon, whereby alkaline polysulfids soluble in water are formed, plunging the melted mass into water, whereby a magnetic precipitate is formed and the polysulfids dissolved in the water, separating the solution from the precipitate, subjecting the same to the action of air and sulfurous-acid gas forced thereinto, whereby monosulfids of iron, together with the precious metals are precipitated, maintaining the alkalinity of the solution during the operation of precipitation by addition of an alkaline substance, as lime, separating the solution from the monosulfid-of-iron precipitate, extracting from the latter the copper, and then the precious metal, and separating the arsenic and antimony from the solution by precipitation, substantially as set forth.

In testimony whereof I affix my signature in presence of two witnesses.

MICHEL BODY.

Witnesses:
GREGORY PHELAN,
EDGARD DE EYMONTOWICZ.